United States Patent
Wilmsen et al.

(10) Patent No.: US 6,578,030 B1
(45) Date of Patent: Jun. 10, 2003

(54) METHOD AND APPARATUS FOR MAPPING ONE CATALOG INTO ANOTHER CATALOG

(75) Inventors: James Michael Wilmsen, Westminster, CO (US); Michael Renn Neal, Superior, CO (US); Nathan Eric Wykes, Broomfield, CO (US); Ian Straub, Broomfield, CO (US)

(73) Assignee: Requisite Technology Inc., Westminster, CO (US)

( * ) Notice: Subject to any disclaimer, the term of this patent is extended or adjusted under 35 U.S.C. 154(b) by 433 days.

(21) Appl. No.: 09/608,784

(22) Filed: Jun. 30, 2000

(51) Int. Cl.$^7$ ................................................ G06F 17/30
(52) U.S. Cl. ...................... 707/3; 707/100; 707/104.1; 705/27
(58) Field of Search ........................... 707/3, 100, 2, 707/4, 5, 7, 9, 10, 104.1, 205; 705/27; 709/217, 223; 713/200, 201, 187; 715/513; 717/168

(56) References Cited

U.S. PATENT DOCUMENTS

| | | | |
|---|---|---|---|
| 5,740,425 A | * 4/1998 | Povilus | 707/100 |
| 6,055,516 A | * 4/2000 | Johnson et al. | 705/27 |
| 6,085,187 A | * 7/2000 | Carter et al. | 707/3 |
| 6,169,992 B1 | 1/2001 | Beall et al. | 707/103 |
| 6,360,216 B1 | * 3/2002 | Hennessey et al. | 707/3 |

* cited by examiner

*Primary Examiner*—Dov Popovici
*Assistant Examiner*—Hassan Mahmoudi
(74) *Attorney, Agent, or Firm*—Blakely, Sokoloff, Taylor & Zafman LLP

(57) ABSTRACT

The present invention provides a method for converting a searchable electronic catalog of the type used in e-commerce and industrial materiel systems. Such catalogs are typically configured as databases but can be created from a variety of different source materials. The method includes identifying a set of items to be converted, identifying the characteristics for each item, accessing the characteristic values for each identified item, accessing mapping rules for each characteristic and each item, mapping the characteristic values for each item in the first catalog into the characteristic identified by the rule for the item in the second catalog, and compiling the mapped characteristic values for each item to form the second catalog.

32 Claims, 2 Drawing Sheets

METHOD AND APPARATUS FOR MAPPING ONE CATALOG INTO ANOTHER CATALOG

FIELD OF THE INVENTION

This invention relates to electronic databases in general, and more specifically to a method and apparatus for mapping one catalog into another catalog in which the first catalog uses a different format from the second catalog.

BACKGROUND OF THE INVENTION

Searchable electronic catalogs are commonly used in support of electronic commerce and purchasing functions. These electronic catalogs typically are rendered into databases, HTML page collections and other electronic means. Individual purchaser or marketplace system installations benefit by maintaining a single catalog rather than several different catalogs from several different sources. With multiple catalogs, for example, an office supply procurement system may contain office supply catalogs from several different office supply vendors or manufacturers. Some of the catalogs may describe identical items such as a blue pen while each catalog will likely describe similar but different items, such as different makes of blue pens. By combining the catalogs into a single catalog, desired items can be found and compared more quickly and easily than with multiple catalogs.

Unfortunately, different purchaser and marketplace installations have different specifications for a combined electronic catalog. These specifications arise from differences in languages and measuring, from regional legal requirements, from needs in the particular industry or marketplace or from preferences of the catalog user. Different preferences in categorizing items also create different requirements. Still, for optimum catalog usage, it is preferred that all desired items are included in a single catalog and described in a consistent way so that the greatest choice of items can be readily and quickly found and compared. In order to satisfy the differing needs of purchasers and marketplaces, it is desirable to be able to create catalogs in different formats from a single electronic catalog, a source catalog. The source catalog supports purchases from many vendors quickly and efficiently. It is consistently updated and maintained. Yet the source catalog may not be in just the format which is desired by some purchasers or marketplaces. It may not have the desired units of measurement required by a particular buyer or it may not list country of manufacture using a convention desired in a particular marketplace. Attributes may be combined for some items where it is preferred that they be separate or vice versa. The present invention allows an electronic catalog in one format to be quickly converted into an electronic catalog in another format. The electronic catalog can be mapped from or into the source catalog or from or into any other format that is desired or preferred for the intended application.

SUMMARY OF THE INVENTION

In a preferred embodiment, the present invention is a method for converting a first electronic catalog, having values for characteristics, such as attributes and categories, for a plurality of items in a first format, into a second electronic catalog having values for characteristics for a plurality of items in a second format. The method includes: identifying a set of items to be converted, identifying the characteristics for each item, accessing the characteristic values for each identified item, accessing mapping rules for each characteristic and each item, mapping the characteristic values for each item in the first catalog into the characteristic identified by the rule for the item in the second catalog, and compiling the mapped characteristic values for each item to form the second catalog. The mapping may include converting characteristic values for each item to be mapped into the second catalog into new characteristic values for the second catalog using conversion methods provided by the accessed rule. The conversion method may include converting the expression of the characteristic values from one form to another, translating a characteristic value from one language into another, converting a measure from one unit of measure to another, replacing an abbreviation with another abbreviation, or changing the order of values for a characteristic into another order.

In a further preferred embodiment, the accessed mapping rule specifies a default characteristic value into which the first catalog characteristic value is mapped and also specifies an alternate characteristic value into which the first characteristic value is to be mapped for special cases. The special cases apply to particular identified items, to particular identified attributes, or to particular identified categories. Different mapping rules may be specified as a default for different characteristics as well as for the same characteristic in different categories or groups of items.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

The present invention is directed toward converting an electronic catalog of items with associated characteristics that describe the items into a second electronic catalog in a different format. The catalog constitutes a list of items and an associated description of each item. The catalog can be in the format of a database or any other electronic format, such as a spreadsheet or text. The catalog is created, expanded, updated or maintained based on any such electronic format. The software that operates on the catalog can be written to handle a variety of different formats. The present application will describe the invention in terms of a database catalog. In the context of the present invention, the terms catalog and database should not be construed as limited to any particular type of structure but rather in a broader sense as a list or a sequence in which items are accompanied by descriptions. Such a catalog or database can be viewed, for example, as a collection of two-dimensional tables in which each row represents a different item or record and each column represents a different characteristic or field, such as an attribute or category. In the case of a catalog of office supplies, a record provides the catalog information for a particular office supply item such as a particular pen. Different pens each have a different record. For each record, there are several fields. Each field describes an attribute of the item such as price, color, weight, size, etc. Other fields describe categories for the item such as dry goods, office supplies, writing implements. The present invention applies to the values that are entered into the fields of the database, whether they are attributes or categories or any other characteristic of an item. Table 1 below shows an example of a portion of a table of catalog information for three items in a magazine rack category. In Table 1, each item occupies a different column. The attributes are identified on the left and the attribute values for each item are provided in the respective column.

TABLE 1

| Category: | Magazine Racks | Magazine Racks | Magazine Racks | ... |
|---|---|---|---|---|
| Item ID | 00345872 | 00345873 | 00345874 | |
| UOM: | EA | EA | EA | |
| Price: | 234 | 499 | 110.95 | |
| Sup Name: | Corporate Express | Corporate Express | Corporate Express | |
| Sup Part Num: | 1857119 | 1568220 | 2103679 | |
| Description: | Organizer, Literature, 24 Compartment, Tropic Sand | Organizer, Literature, 60 Compartment, Oak | Display Rack, 23 Pocket, Putty | |
| Mfg Part Num: | SAF9211TS | SIRLO60AO | BDY08136 | |
| Mfg Name: | Safco Products Co | Sirco Office & Computer Furniture | Buddy/Difiglio Ent | |
| Color: | Tropic Sand | Oak | Putty | |
| No. of Compart. | 24 | 60 | 23 | |
| . | | | | |
| . | | | | |
| . | | | | |

Figure 1:
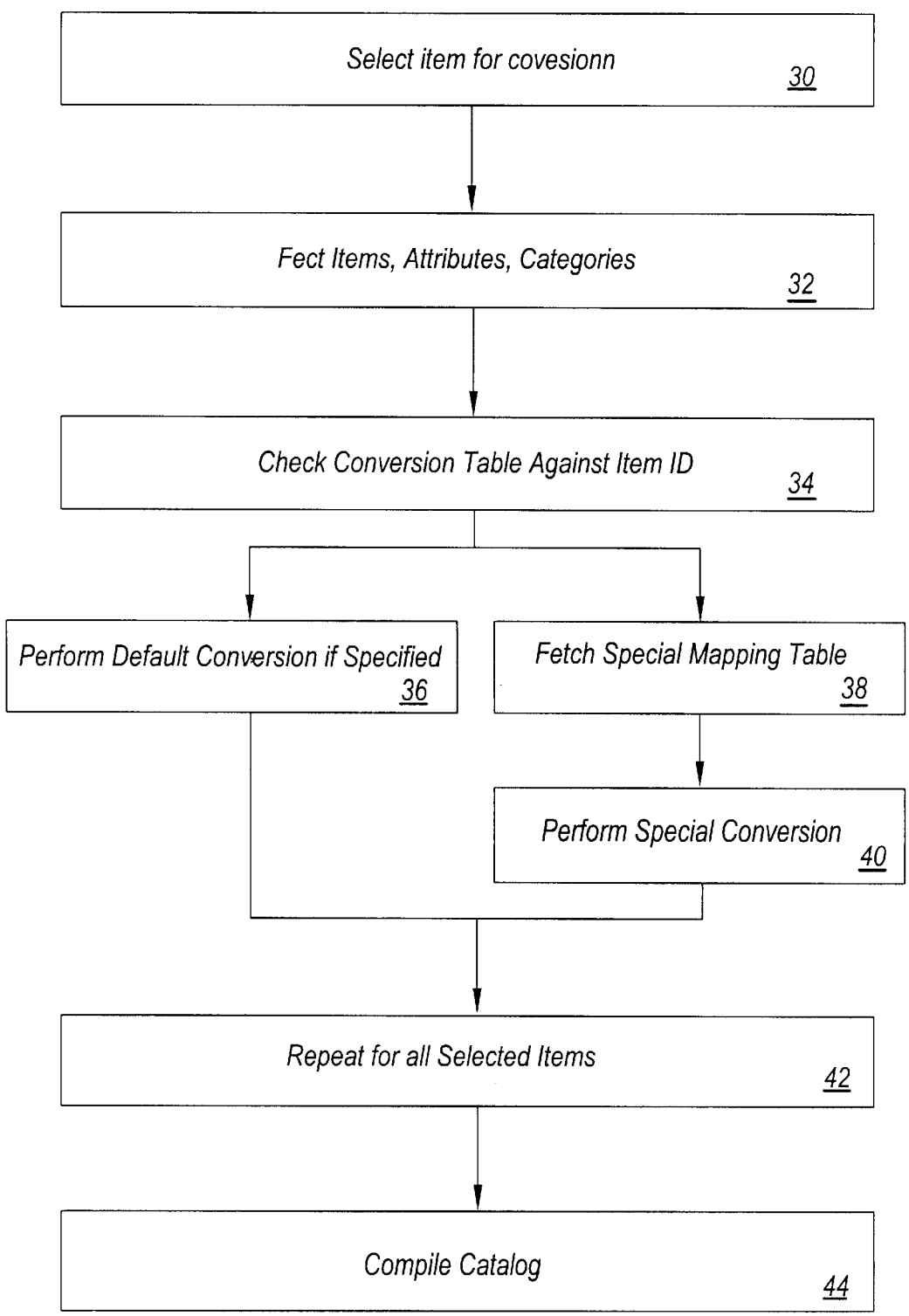
FIG. 1 is a flow diagram showing an embodiment of the present invention.

FIG. 1 shows a generalized flow diagram for implementing the present invention. The process is preferably used to create one electronic catalog from an existing electronic catalog. This is important when a new catalog which presents information about items in a new way is desired either to meet certain business requirements or to satisfy unique tastes. For example, a building supply wholesaler and an aircraft manufacturer may purchase the same fasteners from the same supplier but have different requirements for finding and ordering the fasteners. Similarly, an aircraft manufacturer in Norway and an aircraft manufacturer in the United States may have different requirements for ordering the same fastener. The present invention is also useful when reconfiguring an existing catalog to accommodate changes in industry or the marketplace. For example, a product may appear to fit within an existing category but later become such a large group of products that it requires its own category. Alternatively, different users may have different data classification standards for the same item, requiring the same item to fall into different categories for the different users.

Initially items are selected for conversion 30. The selection of the items can be made on the basis of a search through the first catalog. Typically all items will be selected, however, the selection will depend on the intended use of the catalog. For example, if the purpose of conversion is to accommodate a reclassification of items in the first catalog, then only the reclassified items need to be selected. Items can be selected based on a search of the catalog for all items of a particular manufacturer, all items having a particular range of SKUs (Stock Keeping Units) or based on a search for any desired categories or attributes. Next the values for the selected items are retrieved from the catalog 32. In a preferred embodiment, each item in the catalog has a value for several attributes, such as price, color, supplier, part number, weight, size, name, and a value for a category such as pens. The invention may also be applied to catalogs with multiple categories or multiple levels of categories or with any other structure of descriptive characteristics that are associated with each item.

Each selected item is then checked against a table that contains the conversion information to go from the first catalog format to the second catalog format 34. It is presently preferred that the conversion be performed on each item, one item at a time, however, the conversion can be performed on attributes or categories and the list organized by attribute or category. The conversion can alternatively be performed on all items with each step being performed for each item before moving on to the next item.

The table will not only specify the conversion rule but will also specify whether there are any special cases to apply. If there is a special case to apply then it is fetched from the table referred to in the conversion table 38. It is preferred that this table contain a listing of the items to which a special case apply together with the specific unique conversion as will be better understood in the context of the description below. If there is no special case, or if the special case does not apply to the item in question, then the default conversion is performed 36. As is well-known in the art, the structure of the table need not necessarily be a series of rows and columns but can be expressed in many different formats. It is presently preferred that the table be expressed as a sequence of XML (Extensible Markup Language) Statements.

The default conversion can take many forms, differing in complexity. A straightforward conversion is to change the value for an attribute or category for a particular item to a different value for the same attribute or category for the item. For example, the first catalog may have a category called "Writing Instruments" and the second catalog may use "Pens" instead. This is a matter of user preference and the present invention, through the mapping tables, can accommodate many different style preferences. The rule then maps all the category values that are "Writing Instruments" into "Pens." The same principle applies when converting the catalog into a different language. Each value will be mapped directly into a selected corresponding expression in the language of the second catalog. For example, the color attribute value "Black" maps to "Svart" and the color attribute "Brown" maps to "Brun." The table will provide mapping rules for all of the conversions for all anticipated values of the relevant attribute. The same principle also applies to the use of abbreviations and the use of case. The table for the item may require that "cc." be mapped to "CC," that "ea." be mapped to "each," or that "Lbs." be mapped either to "Pd." or to "Net Pounds."

The same principle also applies to changes in category or attributes. The first catalog may provide a single category "Ballpoint Pens," while the second catalog includes "Ballpoint Pens" as a subcategory to "Pens" which is a subcategory to "Office Supplies." In this case, there is a one-to-one mapping for the items with the category value "Ballpoint Pens" into all three of the tiered categories in the second catalog. Accordingly, based on the category value "Ballpoint Pens," the table will specify a mapping of the value "Ballpoint Pens" into the first tier category, "Pens" into the second tier category and "Office Supplies" into the third tier category. In another example, the first table may provide for an attribute of "Description" while the second table may provide for an attribute of "Ink Color." In order to make the conversion, the ink color values in the description attribute must be mapped to the "Ink Color" attribute. This mapping will work well for pens and pencils but for erasers, a different mapping will be required. The mapping for erasers can be identified as a special case.

It is preferred that the table provide a default rule and if there is a special case for particular items, that the special case be treated in another table. For the examples above, there may be some items in the "Writing Instruments" category that are not to be mapped to "Pens," for example. The special mapping table will identify these items by item number, supplier and supplier part number, or some other unique identifier, and instead map them to a different category such as "Markers." The default table accommodates the greatest number of items in the simplest way and permits the complicated cases to be handled separately. In another example, it may be preferred for some applications that "cc." be mapped to "CC" only for some items but for other items that "cc." be mapped to "ML" due to the particular market or industry served by the catalog. Again, in such a case the default mapping is to "CC" and the special case is to "ML."

The simplest case above, mapping items in the "Writing Instruments" category to the "Pens" category can be called a one-to-one mapping. For a one-to-one mapping, when a value for a particular attribute or category is to be mapped into a different attribute or category, the default mapping table just described is used. When there is a special case, this is a conditional mapping, for example the "cc." to either "CC" or "ML." For a conditional mapping, when the same value for different items is to be mapped into a different value depending upon the item, then a special case is used to distinguish which mapping is to be applied to which item. For a many-to-one mapping, when several different values are to be mapped to the same value, again the default rule for each value is used. This would be the case if "Ballpoint Pens" were to be mapped to "Pens" and "Roller Ball Pens" were also to be mapped to "Pens." As can be understood from the examples above, using this basic structure of tables with defaults and special cases, any type of mapping can be accommodated, one-to-one, one-to-many, many-to-one, many-to-many, etc.

Additional operations can be added to the mapping table to accommodate more sophisticated changes. For example, if a first catalog requires different units of measure from a second catalog, e.g., inches and centimeters, then it is not enough to change the designation of the unit of measure, the numerical value must be converted, e.g. the value in inches must be multiplied by 2.54. Accordingly, the table sets forth not only the mapping of the units designator (in.) to another designator (cm.) but also the conversion rule for converting the numerical value to the new units of measure. Another example is if the second catalog requires a different grammatical structure, e.g. "Blue Pen," not "Pen, Blue." Again the table must specify that the words are to be reversed in order and the comma deleted.

Another level of complexity is required for some types of mapping such as when multiple attributes or catalogs are collapsed into a single attribute or category in the second catalog. For example, the first catalog may have attributes of "Width," "Height," and "Depth," while the second catalog has "Size." In such a case, the table sets forth that the values for the three attributes are assembled together with the desired syntax, e.g. "x" between each number, and mapped into the "Size" attribute. Similarly, the table will accommodate a change in the opposite direction by specifying that the value is to be disassembled and the values each mapped into one of the three respective attributes. The specifics can be written in a regular expression language that describes the manipulation that is to be applied to the data.

According to FIG. 1, the default conversion is applied to the item, if the default conversion is specified 36. Alternatively, if a special mapping is specified, then the table for the special case is retrieved 38 and the conversion for the special case, as outlined above, is applied 40. This process is repeated until all of the selected items are converted 42. In a preferred embodiment, the process is performed item-by-item and every attribute and category for the item to which a conversion applies is converted before moving on to the next item. As mentioned above, the conversion can be performed in any other order. Similarly the conversion can be based on attributes, categories or any other characteristic of items in the catalog. For example, all attribute values for a particular attribute can be converted for every item before moving to the next attribute. If conversion is only required for some of the characteristics of the items, this approach may be preferred.

Tables 2 and 3 below show, as an example, a result of mapping one of the magazine racks from the first catalog shown in Table 1 into a second catalog. Table 2 shows the partial table from the first catalog for a magazine rack shown in Table 1. Table 3 shows a hypothetical example of how the magazine rack can be mapped into a second catalog applying the principles of the present invention. All of the information in the second catalog (Table 3) is derived from information in the first or source catalog (Table 2). The category has been renamed, several of the attributes have been renamed, the values for UOM, price and description have been modified. Price has been converted from dollars to pounds and the units designator "£" has been inserted. Finally, Mfg Part Num has been deleted. These changes all represent examples of the kinds of changes that can be performed to a single item applying the present invention. By applying the present invention to build an entire catalog, the second catalog can become very different from the source catalog.

TABLE 2

| Category: | Magazine Racks | ... |
|---|---|---|
| Item ID | 00345872 | |
| UOM: | EA | |
| Price: | 234 | |
| Sup Name: | Corporate Express | |
| Sup Part Num: | 1857119 | |
| Description: | Organizer, Literature, 24 Compartment, Tropic Sand | |
| Mfg Part Num: | SAF9211TS | |
| Mfg Name: | Safco Products Co | |
| Color: | Tropic Sand | |
| No. of Compart. | 24 | |
| . | | |
| . | | |
| . | | |

TABLE 3

| Category: | Storage and Containers | ... |
|---|---|---|
| Item ID | 00345872 | |
| UOM: | Each | |
| Price: | 156£ | |
| Vendor: | Corporate Express | |
| Vendor ID: | 1857119 | |
| Description: | Magazine Racks, Literature Organizer | |
| Manufacturer: | Safco | |

TABLE 3-continued

| Category: | Storage and Containers | ... |
|---|---|---|
| | Products Co | |
| Color: | Tropic Sand | |
| No. of Compart. | 24 | |
| . | | |
| . | | |
| . | | |

Finally, the converted values are compiled into a catalog 44. The catalog is an electronic catalog that can be stored or used in any desired format. As can be understood from the description above, the second catalog generated from the present invention is a fully functional catalog and allows far more functionality than a simple report or a display version. It retains all the functionality of the first catalog although it is configured differently. In addition, it does not necessarily replace or eliminate the first catalog. It does not necessarily affect the first catalog in any way. It is a second catalog based on all or part of the first catalog. The size of the second catalog is determined by the number of items of the first catalog that are selected for conversion and by the effects of applying the conversion rules. As mentioned above, it is preferred that a single catalog be maintained with full updates to all items so that partial and reconfigured catalogs may be provided at any time using the present invention. In this way, it is no longer necessary to separately maintain each of the catalogs.

The present invention is preferably implemented in Java software instructions using XML (Extensible Mark-up Language) although any other computer programming language can be used. The Java code can be run on a wide variety of computer systems. The preferred XML implementation is designed to allow maximum flexibility by specifying as little as possible in the XML document type definition (DTD). Preferably, a language is specified to support the modification of the existing structure of items within a catalog. To implement the mapping, each affected schema or data element has an XML attribute that specifies the action to perform and sub-elements that specify the data upon which the action is performed. The available options for the action attribute are ADD, UPDATE, DELETE, MOVE, COPY. This allows catalogs to communicate changes to one another. A catalog can communicate deletes, updates to content, and reclassifications of items using the MOVE action. The reclassifications support mapping of category specific attributes so that data is not lost during a reclassification. The XML statements easily permit the mappings to be specified by user, category, attribute or the nature of a value in the catalog.

The following example XML statement shows how a move action can be used to map all items in the "Pens" category of the source catalog to a "Fine Writing Instruments" category in a second catalog. In addition, values for attributes of "Color" and "Point" are mapped to the corresponding attributes in the second catalog that are labeled "Ink Color" and "Point Style."

```
<!-- Move all items in the Pens to the Markers category. Map the value
for
the Color and Point attributes in the Pens category to Ink Color and Point
Style in the Fine Writing Pens category -->
<ITEM action="MOVE">
    <OWNER><NAME>Pens</NAME></OWNER>
    <UPDATE>
        <OWNER><KEY>Fine Writing Pens</KEY></OWNER>
        <KEYVALUE>
            <KEY>Ink Color</KEY>
            <VALUE>Color</VALUE>
        </KEYVALUE>
        <KEYVALUE>
            <KEY>Point Style</KEY>
            <VALUE>Point</VALUE>
        </KEYVALUE>
    </UPDATE>
</ITEM>
```

The following XML statement provides an example of how to convert from units of measurement using an "ADD" action. First the statement creates a new attribute "Product Shipping Weight" to a category of items "Pen Gift Set." The statement takes the weight for the existing items, converts it to grams and adds the designation "gram" to the value for the "Product Shipping Weight" attribute.

```
<!-- Add an attribute called Product Shipping Weight to the Pen Gift Set
category. Application specific NAMEVALUE's for length, hidden,
searchable and default value. Pound is the base unit of measure and gram
is a derived with its conversion specified-->
<ATTRIBUTE action="ADD">
    <NAME>Product Shipping Weight</NAME>
    <OWNER><NAME>Pen Gift Set</NAME></OWNER>
    <TYPE>String</TYPE>
    <NAMEVALUE>
        <NAME>LENGTH</NAME>
        <VALUE>100</VALUE>
    </NAMEVALUE>
    <NAMEVALUE>
        <NAME>HIDDEN</NAME>
        <VALUE>YES</VALUE>
    </NAMEVALUE>
    <NAMEVALUE>
        <NAME>SEARCHABLE</NAME>
        <VALUE>YES</VALUE>
    </NAMEVALUE>
    <NAMEVALUE>
        <NAME>DEFAULTVALUE</NAME>
        <VALUE>5</VALUE>
    </NAMEVALUE>
    <UNITELEMENT action="ADD" type="BASE">
        <NAME>Pounds</NAME>
    </UNITELEMENT>
    <UNITELEMENT action="ADD" type="DERIVED">
        <NAME> Gram </NAME>
        <MULTIPLIER>453.5</MULTIPLIER>
        <ADDER>0</ADDER>
    </UNITELEMENT>
</ATTRIBUTE>
```

Figure 2:
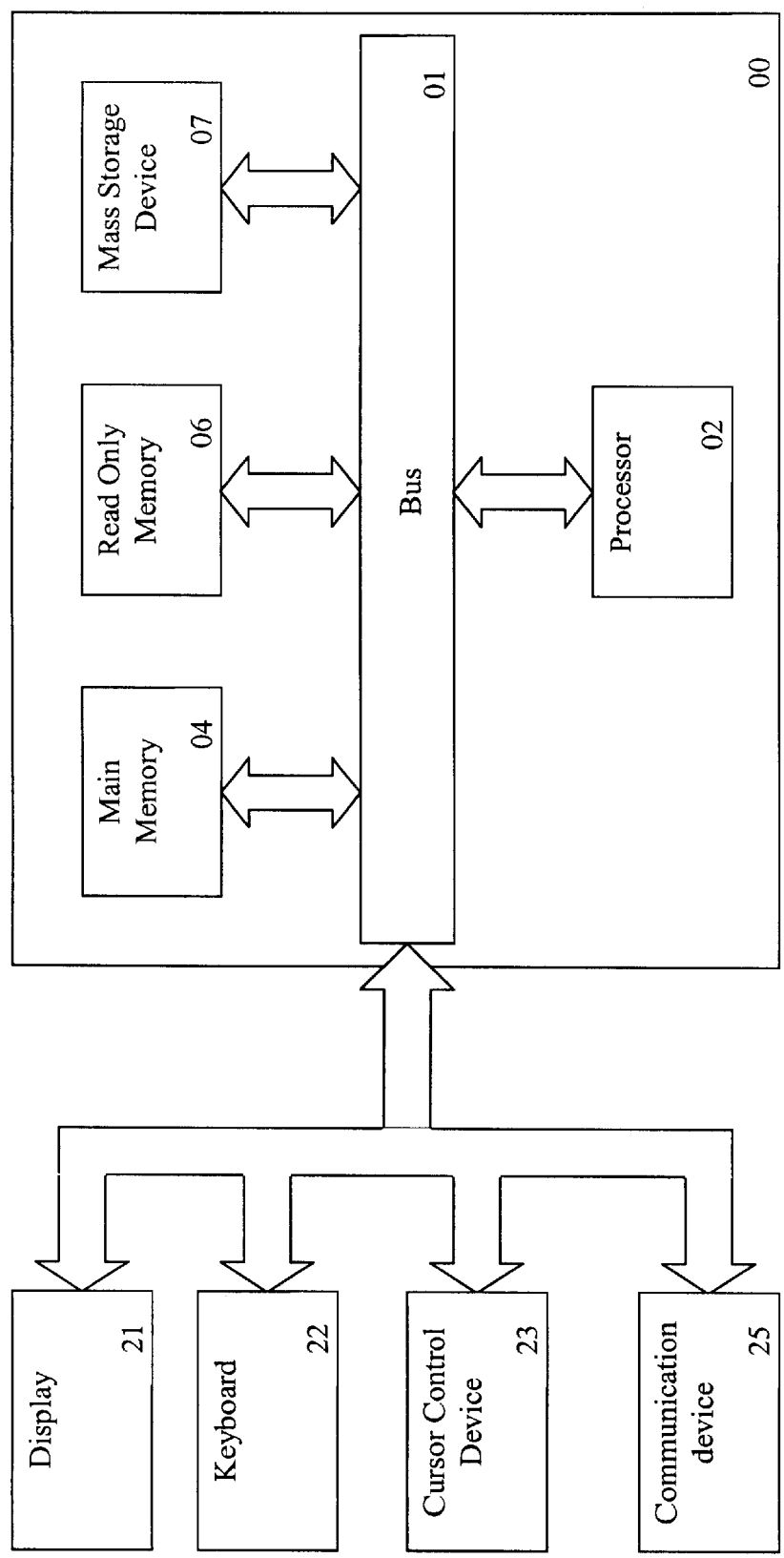
FIG. 2 is an example of a typical computer system upon which an embodiment of the present invention may be implemented.

An example of a computer system upon which the present invention may be implemented will now be described with reference to FIG. 2. The computer system comprises a bus or other communication means 1 for communicating information, and a processing means such as a processor 2 coupled with the bus 1 for processing information. The computer system further comprises a random access memory (RAM) or other dynamic storage device 4 (referred to as main memory), coupled to the bus 1 for storing information and instructions to be executed by the processor 2. The main memory 4 also may be used for storing temporary variables or other intermediate information during execution of instructions by the processor 2. The computer system may also include a read only memory (ROM) or other static storage device 6 coupled to the bus 1 for storing static information and instructions for the processor 2.

A data storage device 7 such as a magnetic disk or optical disc and its corresponding drive may also be coupled to the computer system for storing information and instructions. The computer system can also be coupled via the bus 1 to a display device 21, such as a cathode ray tube (CRT) or Liquid Crystal Display (LCD), for displaying information to an end user. For example, graphical and textual indications of installation status, time remaining in the trial period, and other information may be presented to the prospective purchaser on the display device 21. Typically, an alphanumeric input device 22, including alphanumeric and other keys, may be coupled to the bus 1 for communicating information and command selections to the processor 2. Another type of user input device is a cursor control 23, such as a mouse, a trackball, or cursor direction keys for communicating direction information and command selections to the processor 2 and for controlling cursor movement on the display 21.

A communication device 25 is also coupled to the bus 1. The communication device 25 may include a modem, a network interface card, or other well known interface devices, such as those used for coupling to Ethernet, token ring, or other types of physical attachments for purposes of providing a communication link to support a local or wide area network, for example. In any event, in this manner, the computer system may be coupled to a number of clients or servers via a conventional network infrastructure, such as a company's Intranet or the Internet, for example.

It may be appreciated that a lesser or more equipped computer system than the example described above may be desirable for certain implementations. Therefore, the configuration of the computer system will vary from implementation to implementation depending upon numerous factors, such as price constraints, performance requirements, technological improvements, and other circumstances.

It should be noted that, while the steps described herein may be performed under the control of a programmed processor, such as the processor 2, in alternative embodiments, the steps may be fully or partially implemented by any programmable or hard coded logic, such as Field Programmable Gate Arrays (FPGAs), Transistor-Transistor Logic (TTL), or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the above description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention, as described above, includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention are described with reference to mapping one catalog format into another, the method and apparatus described herein are equally applicable to the conversion of any sort of database which requires a change in format. For example, the techniques described herein are thought to be useful in connection with databases for client or customer management, for inventory management and for transportation management and scheduling.

While this invention has been particularly shown and described with reference to a preferred embodiment thereof, it will be understood by those skilled in the art that variations, adaptations and modifications may be made therein without departing from the spirit and scope of the invention as defined by the following claims.

What is claimed is:

1. A method for converting a first electronic catalog, having values for characteristics for a plurality of items in a first format, into a second electronic catalog having values for characteristics for a plurality of items in a second format, the method comprising:

identifying a set of items to be converted;

identifying the characteristics for each item;

accessing the characteristic values for each identified item;

accessing mapping rules for each characteristic and each item, the mapping rules including a rule specifying a default characteristic value into which a first characteristic value is mapped and also specifies an alternate characteristic value into which the first characteristic value is mapped for special cases;

mapping the characteristic values for each item in the first catalog into the characteristic identified by the rule for the item in the second catalog, the mapping including converting the expression of the characteristic values from one form to another, the converting including replacing an abbreviation for a characteristic value with another abbreviation for the same characteristic value;

compiling the mapped characteristic values for each item to form the second catalog.

2. The method of claim 1 wherein the items are described by attributes and the characteristics comprise attributes of the items.

3. The method of claim 1 wherein the items are associated with categories and the characteristics comprise categories of the items.

4. The method of claim 1 wherein mapping further comprises converting characteristic values for each item to be mapped into the second catalog into new characteristic values for the second catalog using conversion methods provided by the accessed rule.

5. The method of claim 1 wherein converting further comprises translating a characteristic value from one language into another.

6. The method of claim 1 wherein converting further comprises converting a measure from one unit of measure to another.

7. The method of claim 1 wherein converting further comprises changing the order of values for a characteristic into another order.

8. The method of claim 1 wherein mapping further comprises mapping characteristic values in the first catalog into a characteristic in the second catalog, the second catalog characteristic having characteristic values from a plurality of characteristics in the first catalog.

9. The method of claim 8 wherein mapping characteristic values in the first catalog into a characteristic in the second catalog comprises mapping a characteristic value in a dimension characteristic into a characteristic having a plurality of dimensions.

10. The method of claim 1 wherein mapping further comprises mapping a plurality of characteristic values in a first characteristic in the first catalog to a single characteristic value in a characteristic in the second catalog.

11. The method of claim 1 wherein mapping further comprises mapping characteristic values from a characteristic in the first catalog into a plurality of characteristics in the second catalog.

12. The method of claim 11 wherein the first catalog characteristic values are separated into a plurality of different characteristics corresponding to each of the plurality of characteristics in the second catalog.

13. The method of claim 11 wherein the first catalog characteristic values are alternately mapped into different ones of the plurality of characteristics in the second catalog as determined by the rule.

14. The method of claim 1 wherein the special cases apply to particular identified items.

15. The method of claim 1 wherein the items are associated with categories and the special cases apply to particular identified categories.

16. The method of claim 1 wherein items are associated with categories and wherein the mapping rules are linked to categories so that different rules may be applied to different categories.

17. A machine readable medium having stored thereon data representing sequences of instructions which, when executed by a processor, cause the processor to perform operations comprising:

identifying a set of items to be converted from a first format in a first electronic catalog;

identifying the characteristics for each item;

accessing the characteristic values for each identified item;

accessing mapping rules for each characteristic and each item, the mapping rules including a rule specifying a default characteristic value into which a first characteristic value is mapped and also specifics an alternate characteristic value into which the first characteristic value is mapped for special cases;

mapping the characteristic values for each item in the first catalog into a characteristic identified by the rule for the item in a second catalog, the mapping including converting the expression of the characteristic values from one form to another, the converting including replacing an abbreviation for a characteristic value with another abbreviation for the same characteristic value;

compiling the mapped characteristic values for each item to form the second catalog.

18. The medium of claim 17 wherein the items are described by attributes and the characteristics comprise attributes of the items.

19. The medium of claim 17 wherein the items are associated with categories and the characteristics comprise categories of the items.

20. The medium of claim 17 wherein mapping further comprises converting characteristic values for each item to be mapped into the second catalog into new characteristic values for the second catalog using conversion methods provided by the accessed rule.

21. The medium of claim 17 wherein converting further comprises translating a characteristic value from one language into another.

22. The medium of claim 17 wherein converting further comprises converting a measure from one unit of measure to another.

23. The medium of claim 17 wherein converting further comprises changing the order of values for a characteristic into another order.

24. The medium of claim 17 wherein mapping further comprises mapping characteristic values in the first catalog into a characteristic in the second catalog, the second catalog characteristic having characteristic values from a plurality of characteristics in the first catalog.

25. The medium of claim 24 wherein mapping characteristic values in the first catalog into a characteristic in the second catalog comprises mapping a characteristic value in a dimension characteristic into a characteristic having a plurality of dimensions.

26. The medium of claim 17 wherein mapping further comprises mapping a plurality of characteristic values in a first characteristic in the first catalog to a single characteristic value in a characteristic in the second catalog.

27. The medium of claim 17 wherein mapping further comprises mapping characteristic values from a characteristic in the first catalog into a plurality of characteristics in the second catalog.

28. The medium of claim 27 wherein the first catalog characteristic values are separated into a plurality of different characteristics corresponding to each of the plurality of characteristics in the second catalog.

29. The medium of claim 27 wherein the first catalog characteristic values are alternately mapped into different ones of the plurality of characteristics in the second catalog as determined by the rule.

30. The medium of claim 17 wherein the special cases apply to particular identified items.

31. The medium of claim 17 wherein the items are associated with categories and the special cases apply to particular identified categories.

32. The medium of claim 17 wherein items are associated with categories and wherein the mapping rules are linked to categories so that different rules may be applied to different categories.

* * * * *